US007570027B2

(12) United States Patent
Teramoto et al.

(10) Patent No.: US 7,570,027 B2
(45) Date of Patent: Aug. 4, 2009

(54) ELECTRIC POWER GENERATION CONTROL APPARATUS

(75) Inventors: Toshiyo Teramoto, Okazaki (JP);
Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 324 days.

(21) Appl. No.: 11/519,145

(22) Filed: Sep. 12, 2006

(65) Prior Publication Data
US 2007/0080007 A1    Apr. 12, 2007

(30) Foreign Application Priority Data
Oct. 6, 2005    (JP)    ............................. 2005-293100

(51) Int. Cl.
*H02H 11/00*    (2006.01)
*H02P 9/00*    (2006.01)

(52) U.S. Cl. .......................................... 322/24; 322/28

(58) Field of Classification Search .................. 322/24, 322/26, 28, 59; 363/89, 84; 307/10.1
See application file for complete search history.

(56) References Cited

U.S. PATENT DOCUMENTS

| 4,722,042 | A  | * | 1/1988  | Asano et al. | ................... 363/98  |
| 5,349,747 | A  |   | 9/1994  | Dennis       |                             |
| 6,239,996 | B1 | * | 5/2001  | Perreault et al. | ............. 363/89    |
| 6,275,398 | B1 | * | 8/2001  | Sumimoto et al. | ............ 363/89    |
| 6,310,496 | B1 | * | 10/2001 | Nomura       | ....................... 327/112 |
| 6,671,195 | B2 | * | 12/2003 | Perreault et al. | ............. 363/89    |
| 7,304,455 | B2 | * | 12/2007 | Okahara et al. | ............... 322/28   |
| 7,315,149 | B2 | * | 1/2008  | Kizawa et al. | ................. 322/28 |
| 2004/0085787 | A1 | * | 5/2004 | Perreault et al. | .............. 363/89  |
| 2005/0269880 | A1 | * | 12/2005 | Konishi     | ..................... 307/10.7 |

FOREIGN PATENT DOCUMENTS

| DE | 101 08 540 A1 | 1/2002 |
| EP | 0 556 549 A1 | 8/1993 |
| EP | 0 783 994 A1 | 7/1997 |
| FR | 2 854 286 A1 | 10/2004 |
| JP | 55063598 A | * 5/1980 |
| JP | 63176661 A | * 7/1988 |
| JP | A-2002-112595 | 4/2002 |
| JP | A-2002-369594 | 12/2002 |
| JP | A 2003-88191 | 3/2003 |
| JP | A 2003-348887 | 12/2003 |

* cited by examiner

*Primary Examiner*—Julio C. Gonzalez Ramirez
(74) *Attorney, Agent, or Firm*—Oliff & Berridge PLC

(57) ABSTRACT

An electric power generation control apparatus is connected to an external controller composed of a vehicle interface circuit capable of generating and transferring a power switch-on signal to the electric power generation control apparatus. When receiving the power switch-on signal, the electric power generation control apparatus initiates its operation. The electric power generation control apparatus has a receiving terminal, a control signal receiving circuit, an electric power source circuit, and an electric power generation control circuit. The control signal receiving circuit receives the power switch-on signal through the receiving terminal regardless of the circuit type of the vehicle interface circuit. When the control signal receiving circuit receives the power switch-on signal, the electric power supply circuit initiates to supply the electric power to the electric power generation control circuit. When receiving the electric power from the power supply circuit, the electric power generation control circuit initiates its operation.

16 Claims, 8 Drawing Sheets

ELECTRIC POWER GENERATION CONTROL APPARATUS

CROSS-REFERENCE TO RELATED APPLICATIONS

This application is related to and claims priority from Japanese Patent Application No. 2005-293100 filed on Oct. 6, 2005, the contents of which are hereby incorporated by reference.

BACKGROUND OF THE INVENTION

1. Field of the Invention

The present invention relates to an electric power generation control apparatus, to be connected to an external controller composed of any one of various types of vehicle interface circuits, capable of controlling the generation of electric power of a vehicle alternator mounted on a vehicle.

2. Description of the Related Art

There is a well-known conventional electric power generation control apparatus capable of receiving through an external signal receiving terminal a power switch-on signal transferred from an external controller connected to the electric power generation control apparatus, and thereby initiates the control of the generation of electric power of a vehicle alternator mounted on a vehicle. For example, such a control technique of the generation of electric power in the vehicle alternator has been disclosed in the Japanese patent laid open publication No. JP 2003-88191. (see pages 5 to 14 and FIGS. 1 to 8)

When a user or a driver of a vehicle replaces a vehicle alternator and an electric power generation control apparatus mounted on a vehicle with new ones due to various reasons that the new assembly units do not match the vehicle interface circuit. It may be, that the fault lies with the electric power generation control apparatus in that it is not adopted in circuit type to a vehicle interface circuit incorporated in an external controller. This unmatched assembling causes that a control signal cannot be transferred correctly from the external controller to the electric power generation control apparatus.

For example, there are various unmatched assembling situations in which not needed the external controller is composed of a vehicle interface circuit made of a pull-up circuit, where the electric power generation control apparatus is replaced with a new electric power generation control apparatus having a receiving circuit adopted to a pull-down circuit, or in which the external controller has the vehicle interface circuit made of a pull-down circuit and the electric power generation control apparatus is replaced with a newly installed electric power generation control apparatus having a receiving circuit adopted to a pull-up circuit. In those unmatched assembling situations, because the electric power generation control apparatus inputs only a control signal of a high level or only a control signal of a low level, the receiving circuit in the electric power generation control apparatus cannot receive the control signal such as an electric power switch-on signal transferred from the external controller, and thereby cannot initiate the control of the generation of electric power of the vehicle alternator. In circumstances of bad maintenance or conditions for a vehicle or in emergencies, such an unmatched assembling can happen, in which a user or a driver of a vehicle replaces a vehicle alternator and an electric power generation control apparatus mounted on the vehicle with new ones which do not adopt the circuit configuration of the vehicle interface circuit of the external controller, and when the vehicle travels long distances, a battery mounted on the vehicle becomes discharged and is finally dead because the electric power generation control apparatus cannot correctly receive the control signals transferred from the external controller.

In order to avoid such a drawback while not considering the occurrence of unmatched assembling, namely regardless of any occurrence of unmatched assembling between the electric power generation control apparatus and the external controller, it is necessary to have plural receiving circuits in the power generation control apparatus corresponding to various types of vehicle interface circuits. This increases design work, manufacturing cost, and distribution cost of the power generation control apparatus.

SUMMARY OF THE INVENTION

It is an object of the present invention to provide an improved electric power generation control apparatus capable of controlling the generation of electric power of a vehicle alternator mounted on a vehicle, for use during replacement work without needing to consider the possibility of an unmatched assembly or any circuit type of a vehicle interface circuit incorporated to an external controller, without increasing design work, manufacturing cost, or distribution cost.

In order to achieve the above objects, there is provided an electric power generation control apparatus, as an aspect of the present invention, to be connected to an external controller equipped with a vehicle interface circuit configured to output a control signal. The electric power generation control apparatus of the present invention has a control signal receiving circuit, an electric power supply circuit, and an electric power generation control circuit. The control signal receiving circuit is configured to receive the control signal corresponding to the circuit type of the vehicle interface circuit incorporated in the external controller through a receiving terminal. The electric power supply circuit is configured to initiate its operation when receiving the control signal transferred from the control signal receiving circuit. The electric power generation control circuit is configured to perform the control of the generation of electric power by the vehicle alternator based on the electric power supplied from the electric power supply circuit.

Because even if the external controller equipped with any one of the plural types of the vehicle interface circuits is connected to the electric power generation control circuit according to the present invention, the control signal receiving circuit can correctly receive the control signal such as the power switch-on signal, it is thereby possible to continue the usual operation of the vehicle alternator mounted on a vehicle, and to prevent decreasing the reliability in operation of the electric power generation control apparatus caused by unmatched assembling with the external controller having a different type of vehicle interface circuit from the circuit type of the control signal receiving circuit in the electric power generation control apparatus.

It is preferred that the vehicle interface circuit incorporated in the external controller is made of either a pull-up circuit or a pull-down circuit, which generates a power switch-on signal as the control signal, and transfers the generated power switch-on signal to the electric power generation control apparatus. The pull-up circuit and the pull-down circuit are known as the typical vehicle interface circuit. Even if the external controller is composed of either the pull-up circuit or the pull-down circuit, the electric power generation control apparatus can correctly receive the power switch-on signal transferred from the external controller. Further, because it is thereby not necessary to design and manufacture the electric power generation control apparatus while considering the circuit type of the vehicle interface circuit, the design work and design time of the electric power generation control apparatus can be reduced drastically, and the total number of the circuit types of the electric power generation control apparatus to be adopted to the various circuit types of the vehicle interface circuits can be thereby reduced. This prevents increasing the manufacturing cost and the distribution cost of the electric power generation control apparatus.

Further, according to the present invention, it is desirable for the control signal receiving circuit to detect the power switch-on signal transferred from either the pull-up circuit or the pull-down circuit incorporated in the external controller based on a voltage potential at the receiving terminal. Because the voltage potential at the receiving terminal is changed according to the circuit type of the vehicle interface circuit such as the pull-up circuit and the pull-down circuit, it is possible to reliably detect the transmission of the power switch-on signal from the external controller by detecting the change of the voltage potential at the receiving terminal.

Still further, according to the present invention, it is desirable that the receiving terminal is connected to a connection node between a constant current circuit and a plurality of diodes connected in series, and the control signal receiving circuit detects the power switch-on signal transferred from either the pull-up circuit or the pull-down circuit incorporated in the external controller based on a direction of current flow at the receiving terminal. In general, a diode has a high sensitivity in voltage-response on receiving the power switch-on signal, and can reliably detect the presence of the power switch-on signal because such a diode has a non-linear response characteristic to a current change when compared with a linear-response characteristic of a resistance.

Still further, according to the present invention, it is desirable for the control signal receiving circuit further to have a first leakage protection circuit and a second leakage protection circuit that are selectively connected to the receiving terminal according to the reception of the electric power switch-on signal transferred from various types of the vehicle interface circuits incorporated in the external controller through the receiving terminal. It is thereby possible to prevent the occurrence of error operation in the electric power generation control apparatus to be caused by a leakage current flowing through the vehicle interface circuit in the external controller.

Furthermore, it is desirable for the control signal receiving circuit to have a vehicle interface judgment circuit and a function selection circuit. The vehicle interface judgment circuit is configured to judge a circuit type of the vehicle interface circuit incorporated in the external controller. The function selection circuit is configured to select one of the functions of the electric power generation control circuit based on a judgment result obtained from the vehicle interface judgment circuit. It is possible to perform an optimum control operation of the electric power generation control apparatus that has been set in advance adapted to the vehicle specification even if unmatched assembling between the external controller and the electric power generation control apparatus happens.

Moreover, it is desirable for the electric power generation control apparatus to have an electric power generation control function, to be selectable by the function selection circuit, which controls the generation state of electric power of the vehicle alternator mounted on the vehicle. In particular, the electric power generation control function includes the function to control the generation state of electric power of the vehicle alternator based on an output voltage of the vehicle alternator and the function to the generation state of electric power of the vehicle alternator based on a terminal voltage of a battery connected to the vehicle alternator.

It is thereby possible to prevent occurrence of an over-charging state of the battery to be caused when the control based on the alternator sensing manner is performed under the request from the vehicle side, and on the contrary, possible to prevent an over-discharging state of the battery to be caused when the control based on the battery sensing manner is performed under the request from the vehicle side.

Still further, it is desirable to have a function, as one of the selectable functions, to limit the increasing speed of an exciting current flowing through the vehicle alternator, or to have a function, as another selectable function, to limit an initial rotation number of the vehicle alternator at a start-up of an internal combustion engine mounted on the vehicle.

It is thereby possible to prevent the occurrences of engine-stop and a voltage-drop of the terminals of lamps, and the occurrence of bad-influences to other electric devices caused by the voltage-drop of the battery. The engine-stop of the internal combustion engine mounted on the vehicle happens when unmatched control is performed to the requests from the vehicle side based on the control function to limit the exciting current increasing speed and the control function to limit the initial rotation speed of the vehicle alternator at the engine start-up, and when unmatched control is performed to the request from the vehicle not based on the control function to limit the exciting current increasing speed.

Still further, it is preferred that the electric power generation control apparatus further has an input/output terminal, a judgment circuit, and a terminal switching circuit. In the electric power generation control apparatus, the input/output terminal is connected to the external controller, 10 the judgment circuit is configured to the circuit type of the vehicle interface circuit incorporated in the external controller, and the terminal switching circuit is configured to switch the input/output terminal to one of the input terminal and the output terminal according to the circuit type of the vehicle interface circuit of the external controller judged by the judgment circuit. It is thereby possible to set the function of the input/output terminal in accordance with the vehicle specification and further possible to reduce the number of terminals and wirings when compared with the case in which both the output terminal and the input terminal are formed.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
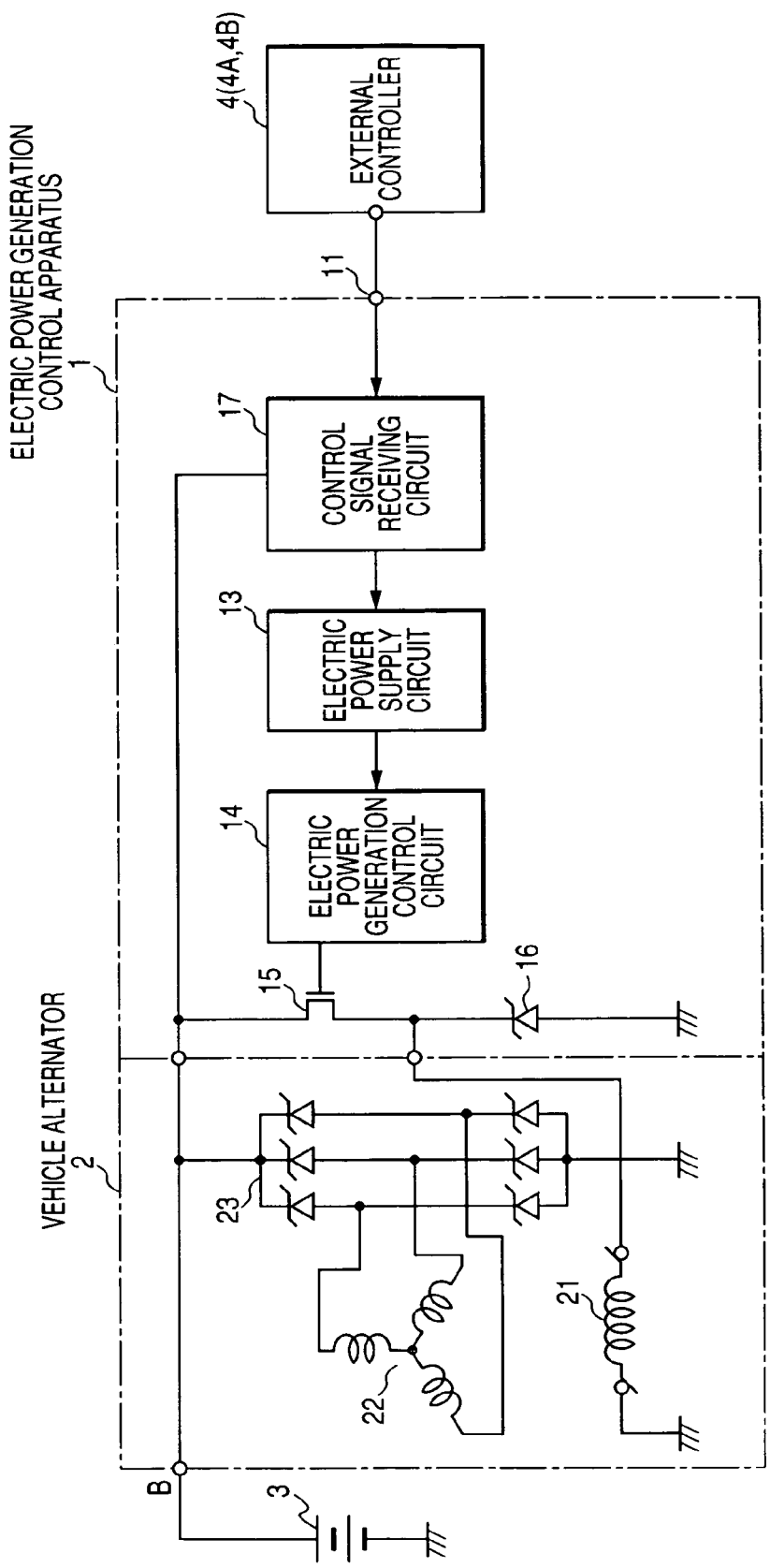
FIG. 1 is a diagram showing an entire configuration of an electric power generation control apparatus having an electric power generation control apparatus according to a first embodiment of the present invention.

Hereinafter, various embodiments of the present invention will be described with reference to the accompanying drawings. In the following description of the various embodiments, like reference characters or numerals designate like or equivalent component parts throughout the several views.

First Embodiment

A description will be given of the electric power generation control apparatus according to the first embodiments of the present invention with reference to FIG. 1 to FIG. 7.

FIG. 1 is a diagram showing an entire configuration of the electric power generation control system having the electric power generation control apparatus 1 according to the first embodiment. As shown in FIG. 1, the electric power generation control system has the electric power generation control apparatus 1, a vehicle alternator 2, a battery 3, and an external controller 4. Various electronic devices (as electric loads, not shown) are mounted on the vehicle and connected to the battery 3. The vehicle alternator 2 is driven by an internal combustion engine (not shown) mounted on the vehicle.

The vehicle alternator 2 has an exciting winding 21 wound on a rotor, a three-phase stator winding 22 wound on a stator, and a rectifier 23 configured to rectify three-phase AC power output from the three-phase stator windings 22. An output terminal (Battery terminal, namely, terminal B) of the vehicle alternator 2 is connected to the battery 3 and the electric loads (not shown). The condition of the generation of electric power by the vehicle alternator 2 is adjusted by controlling the amount of an exciting current flowing through the exciting winding 21.

The electric power generation control apparatus 1 of the first embodiment controls the condition of the generation of electric power of the vehicle alternator 2. The electric power generation control apparatus 1 has an electric power supply circuit 13, an electric power generation control circuit 14, an exciting drive transistor 15, a reflux diode 16, a control signal receiving circuit 17. The exciting circuit to supply a magnetic flux to the rotor of the vehicle alternator 2 is composed of the exciting driving transistor 15 and the reflux diode 16. The exciting driving transistor 15 is connected in series to the exciting winding 21 and supplies the exciting current to the exciting winding 21 under PWM (pulse width modulation) control performed by the electric power generation control circuit 14. The reflux diode 16 is connected in parallel to the exciting winding 21, and refluxes the exciting current which flows through the exciting winding 21 during OFF state of the exciting driving transistor 15.

When receiving a start-up instruction signal (or an electric power switch-on signal) transferred from the external controller 4 (4A and 4B) through the control signal receiving circuit 17, the electric power supply circuit 13 initiates its operation to provide the operational voltage to the electric power generation control circuit 14. The control signal receiving circuit 17 receives various control signals such as an electric power switch-on signal through the receiving terminal 11. When receiving the electric power switch-on signal, the control signal receiving circuit 17 generates and transfers the start instruction signal to the electric power supply circuit 13.

In the first embodiment, the external controller 4 equipped with a vehicle interface circuit transfers various control signals such as the electric power switch-on signal to the receiving terminal 11 of the electric power generation apparatus 1. The control signal receiving circuit 17 is capable of receiving the control signal correctly transferred from the vehicle interface circuit of the external controller 4 through the receiving terminal 11 even if the vehicle interface circuit of the external controller 4 has a different-type vehicle interface circuit. For example, there are two types 4A and 4B (see FIG. 2 to FIG. 7) of the vehicle interface circuits. The vehicle interface circuit 4A is composed of a pull-up circuit to generate and transfer the control signal and the vehicle interface circuit 4B has a pull-down circuit to generate and transfer the control signal. The control signal receiving circuit 17 incorporated in the electric power generation control apparatus 1 of the first embodiment according to the present invention receives the control signal correctly transferred from both types 4A and 4B of the vehicle interface circuits incorporated in the external controller.

Figure 2:
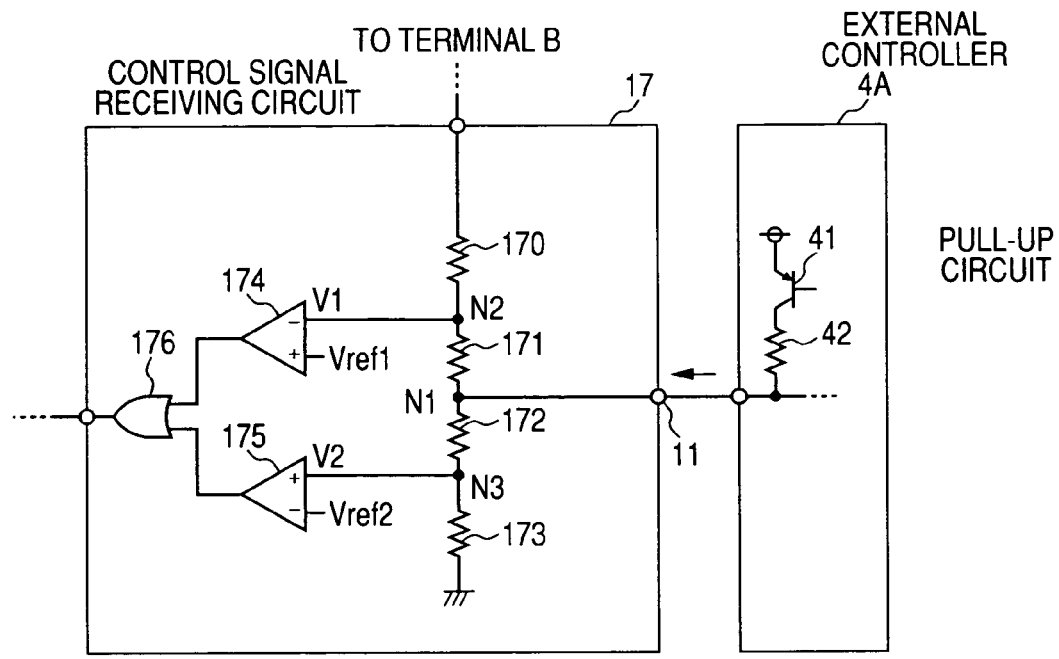
FIG. 2 is a diagram showing a detailed configuration of a control signal receiving circuit in the electric power generation control apparatus shown in FIG. 1.
Figure 3:
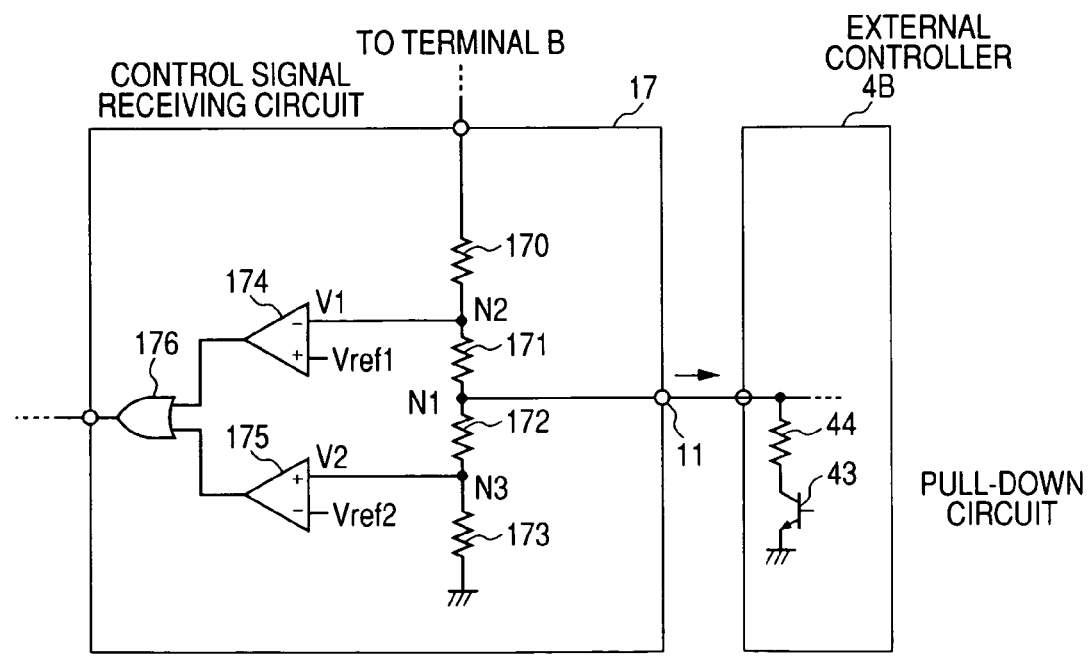
FIG. 3 is a diagram showing the detailed configuration of the control signal receiving circuit in the electric power generation control apparatus shown in FIG. 1.

FIG. 2 is a diagram showing a detailed configuration of the control signal receiving circuit 17 in the electric power generation control apparatus 1 shown in FIG. 1. FIG. 3 is a diagram showing the detailed configuration of the control signal receiving circuit 17 in the electric power generation control apparatus 1 shown in FIG. 1.

FIG. 2 shows a connection state in which the control signal receiving circuit 17 in the electric power generation control apparatus 1 is connected to the external controller 4A equipped with the vehicle interface (I/F) circuit composed of a pull-up circuit. FIG. 3 shows a connection state in which the control signal receiving circuit 17 in the electric power generation control apparatus 1 is connected to the external controller 4B equipped with the vehicle I/F circuit composed of a pull-down circuit.

As shown in both FIG. 2 and FIG. 3, the control signal receiving circuit 17 is composed of resistances 170, 171, 172, and 173, voltage comparators 174 and 175, and an OR circuit 176. Those four resistances 170 to 173 are connected in series and one end of the series of the four resistances 170 to 173 is connected to the terminal B and the other end of the series thereof is grounded.

The receiving terminal 11 is connected to a connection node N1 between the middle two resistances 171 and 172 in the series of the resistances 170 to 173. A connection node N2 between the two resistances 170 and 171 is connected to one input terminal of the voltage comparator 174. The connection node N2 has a voltage potential V1. A connection node N3 between the two resistances 172 and 173 is connected to one input terminal of the voltage comparator 175. The connection node N3 has a voltage potential V2.

A first reference voltage Vref1 is supplied to a positive (+) input terminal of the voltage comparator 174. A second reference voltage Vref2 is supplied to a negative (−) input terminal of the voltage comparator 175. Both the output terminals of the voltage comparators 174 and 175 are connected to input terminals of the OR circuit 176, respectively. The output terminal of the OR circuit 176 is connected to the electric power supply circuit 13.

As shown in FIG. 2, the pull-up circuit forming the external controller 4A is composed of a transistor 41 and a resistance 42. In the first embodiment, the first reference voltage Vref1 and the second reference voltage Vref2 are so set that the relationship V2<Vref2<Vref1<V1 (First detection condition) is satisfied when the transistor 41 in the pull-up circuit is OFF, and the relationship Vref2<V2<Vref1<V1 (Second detection condition) is satisfied when the transistor 41 in the pull-up circuit is ON.

Accordingly, when the external controller has the vehicle I/F circuit made of a pull-up circuit, the voltage comparator 175 outputs a low level signal when the transistor 41 is OFF and the first detection condition (V2<Vref2<Vref1<V1) is satisfied, and on the contrary, the voltage comparator 175 outputs a high level signal when the transistor 41 is ON and the second detection condition (Vref2<V2<Vref1<V1) is satisfied.

As shown in FIG. 3, the pull-down circuit in the external controller 4B is composed of a transistor 43 and a resistance 44. The first reference voltage Vref1 and the second reference voltage Vref2 are so set that the relationship V2<Vref2<Vref1<V1 (First detection condition) is satisfied when the transistor 43 in the pull-down circuit is OFF (like the case of the OFF state of the transistor 41 in the pull-up circuit shown in FIG. 2), and a relationship V2<Vref2<V1<Vref1 (Third detection condition) is satisfied when the transistor 43 in the pull-down circuit is ON.

Accordingly, when the external controller has the vehicle I/F circuit made of a pull-down circuit, the voltage comparator 174 outputs a low level signal when the transistor 43 is OFF and the first detection condition (V2<Vref2<Vref1<V1) is satisfied. On the contrary, the voltage comparator 174 outputs a high level signal when the transistor 43 is ON and the third detection condition (V2<Vref2<V1<Vref1) is satisfied.

Since the OR circuit 176 outputs a logical sum between the output signals from the two voltage comparators 174 and 175, when the transistor 41 in the pull-up circuit incorporated the external controller 4A is ON or when the transistor 43 in the pull-down circuit in the external controller 4B is ON, the OR circuit 176 outputs the high level signal. The OR circuit 176 outputs the low level signal when the other conditions, namely when the transistor 41 in the pull-up circuit is OFF or when the transistor 43 in the pull-down circuit is OFF. Thus, even if the external controller has the vehicle I/F circuit composed of either the pull-up circuit or the pull-down circuit, the control signal receiving circuit in the electric power generation control apparatus 1 of the first embodiment can correctly receive the control signal (as the electric power switch-on signal) transferred form the external controller 4 (4A and 4B).

As described above in detail, because the electric power generation control apparatus 1 of the first embodiment is capable of correctly receiving the electric power switch-on signal regardless of the circuit type of the vehicle interface circuit incorporated in the external controller, for example, which is made of either a pull-up circuit or a pull-down circuit. It is thus possible to receive the power switch-on signal as the control signal regardless of considering the circuit type of the external controller even if unmatched assembling is performed, and thereby possible to increase the reliability of the electric power generation control system mounted on the vehicle during assembling or replacement of the vehicle alternator or the external controller.

The pull-up circuit and the pull-down circuits are widely well-known as the vehicle I/F circuit made of an analogue circuit. The electric power generation control apparatus 1 of the first embodiment is capable of correctly receiving the control signal such an electric power switch-on signal transferred from the external controller 4 without regard to the circuit type of the external controller composed of either the pull-up circuit (see 4A in FIG. 2) or the pull-down circuit (see 4B in FIG. 2). In addition, it is not necessary to design and fabricate the control signal receiving circuit 17 in the electric power generation control apparatus 1 taking into consideration the use of either the pull-up circuit or the pull-down circuit. This reduces the difficulty of the design work and also reduces the design period, and further reduces the total number of circuit types of the electric power generation control apparatus 1 because the electric power generation control apparatus of the present invention can be applied to both the pull-up-circuit and the pull-down circuit forming the external controller. This also reduces the manufacturing cost and the distribution cost in a market.

In particular, because the voltage potential at the receiving terminal 11 is changed according to the connection state to either the pull-up circuit or the pull-down circuit, it is possible to detect accuracy the transmission of the electric power switch-on signal from the external controller by monitoring the voltage potential at the receiving terminal 11.

(Modified Example)

Figure 4:
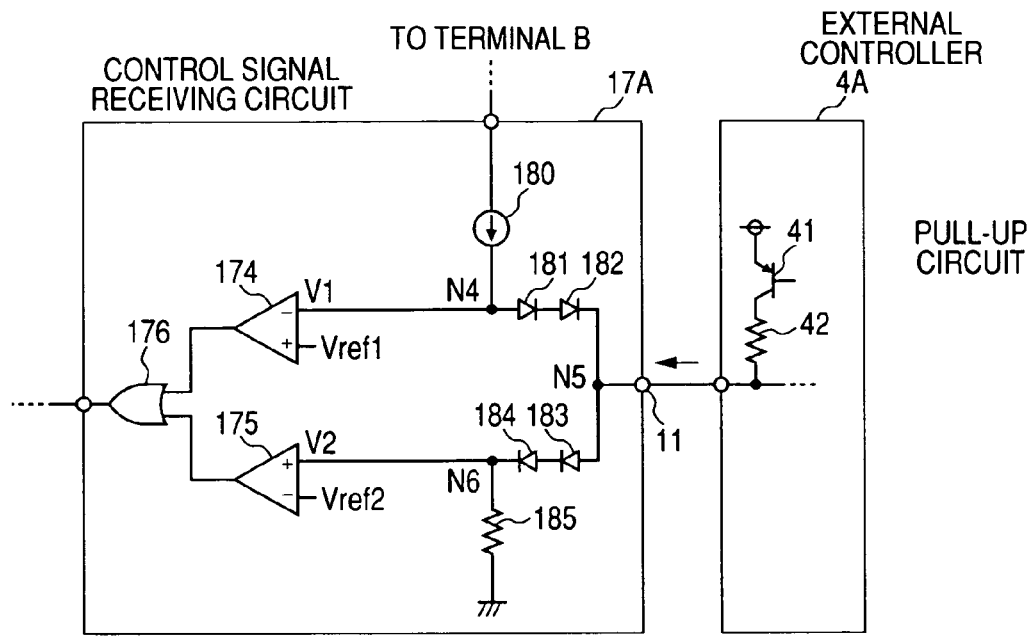
FIG. 4 is a diagram showing a modified configuration of the control signal receiving circuit in the electric power generation control apparatus shown in FIG. 1.
Figure 5:
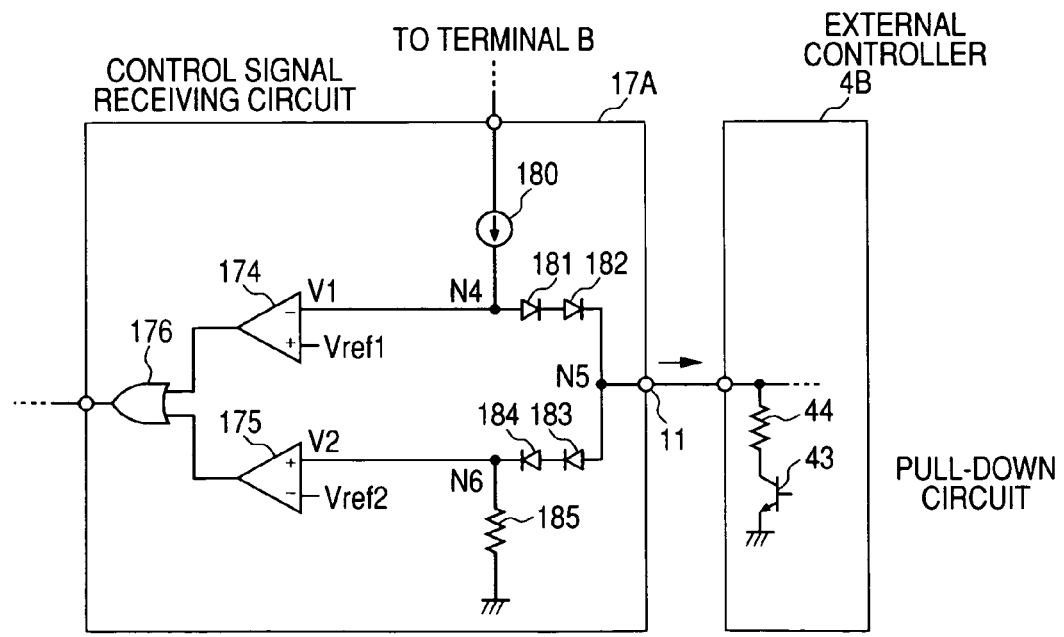
FIG. 5 is a diagram showing a modified configuration of the control signal receiving circuit in the electric power generation control apparatus shown in FIG. 1.

FIG. 4 is a diagram showing a modified configuration of the control signal receiving circuit incorporated in the electric power generation control apparatus of the first embodiment shown in FIG. 1. FIG. 5 is a diagram showing a modified configuration of the control signal receiving circuit the electric power generation control apparatus shown in FIG. 1.

In particular, FIG. 4 shows the control signal receiving circuit 17A as a modified example connected to the external controller 4A composed of the pull-up circuit through the receiving terminal 11. The control signal receiving circuit 17A is incorporated in the electric power generation control apparatus 1 of the first embodiment instead of the control signal receiving circuit 17, as shown in FIG. 1.

FIG. 5 shows the control signal receiving circuit 17A as the modified example connected to the external controller 4B composed of the pull-down circuit.

The control signal receiving circuit 17A as the modified example shown in FIG. 4 and FIG. 5 has a constant current circuit 180, four diodes 181, 181, 182, 183, and 184, and a resistance 185 instead of the resistances 170 to 173 in the control signal receiving circuit 17 shown in FIG. 2 and FIG. 3.

In the configuration of the control signal receiving circuit 17A shown in FIG. 4 and FIG. 5, the constant current circuit 180, the four diodes 181, 182, 183, and 184, and the resistance 185 are connected in series. One end of the series of the diodes 181 to 184 and the resistance 185 is connected to the terminal B of the vehicle alternator 2 through the constant current circuit 180, and the other end of the series (, namely the resistance 185 side) is grounded.

The connection node N5 between the diodes 182 and 183 is connected to the receiving terminal 11. The connection node N4 between the constant current circuit 180 and the diode 181 is connected to the negative (−) input terminal of the voltage comparator 174. The connection node N4 has a voltage potential V1.

The connection node N6 between the diodes 184 and the resistance 185 is connected to the positive (+) terminal of the voltage comparator 175. The connection node N6 has a voltage potential V2. The control signal receiving circuit 17A as the modified example detects the presence of the electric power switch-on signal transferred from the external controller 4A or 4B composed of either the pull-up circuit or the pull-down circuit by monitoring the current direction flowing through the receiving terminal 11. The arrows shown in FIG. 4 and FIG. 5 indicate the direction of current flow at the receiving terminal 11.

As shown in FIG. 4, under the condition where the external controller 4A composed of the pull-up circuit is connected to the control signal receiving circuit 17A in the electric power generation control apparatus 1, the first reference voltage Vref1 and the second reference voltage Vref2 are so set that the relationship V2<Vref2<Vref1<V1 (First detection condition) is satisfied when the transistor 41 in the pull-up circuit is OFF, and the relationship Vref2<V2<Vref1<V1 (Second detection condition) is satisfied when the transistor 41 in the pull-up circuit is ON. Accordingly, when the external controller has the vehicle I/F circuit made of such a pull-up circuit, the voltage comparator 175 outputs a low level signal to the OR circuit 176 when the transistor 41 is OFF and the first detection condition (V2<Vref2<Vref1<V1) is satisfied, and on the contrary, the voltage comparator 175 outputs a high level signal to the OR circuit 176 when the transistor 41 is ON and the second detection condition (Vref2<V2<Vref1<V1) is satisfied.

As shown in FIG. 5, under the condition where the external controller 4B made of the pull-down circuit is connected to the control signal receiving circuit 17A in the electric power generation control apparatus 1, the first reference voltage Vref1 and the second reference voltage Vref2 are so set that the relationship V2<Vref2<Vref1<V1 (First detection condition) is satisfied when the transistor 43 in the pull-down circuit is OFF (like the case of the OFF state of the transistor 41 in the pull-up circuit shown in FIG. 4), and the relationship V2<Vref2<V1<Vref1 (Third detection condition) is satisfied when the transistor 43 in the pull-down circuit is ON.

Accordingly, when the external controller has the vehicle I/F circuit made of such a pull-down circuit, the voltage comparator 174 outputs a low level signal to the OR circuit 176 when the transistor 43 is OFF and the first detection condition (V2<Vref2<Vref1<V1) is satisfied, and on the contrary, the voltage comparator 174 outputs a high level signal to the OR circuit 176 when the transistor 43 is ON and the third detection condition (V2<Vref2<V1<Vref1) is satisfied.

Since the OR circuit 176 outputs a logical sum between the output signals from the two voltage comparators 174 and 175, when the transistor 41 in the pull-up circuit (in the external controller 4A) is ON or when the transistor 43 in the pull-down circuit (in the external controller 4B) is ON, the OR circuit 176 outputs the high level signal. On the contrary, the OR circuit 176 outputs the low level signal when the other conditions, namely when the transistor 41 in the pull-up circuit is OFF or when the transistor 43 in the pull-down circuit is OFF. Thus, even if the external controller has the vehicle I/F circuit made of either the pull-up circuit (in the external controller 4A) or the pull-down circuit (in the external controller 4B), the control signal receiving circuit 17A in the electric power generation control apparatus 1 of the first embodiment can correctly receive the control signal (as the electric power switch-on signal) transferred form the external controller.

In general, because a diode has a non-linear response characteristic of a current when compared with the response characteristic of a resistance, the diode has a highly response sensitivity to receive a control signal such as the electric power switch-on signal transferred from the external controller, and it is thereby possible for the control signal receiving circuit 17A can receive the electric power switch-on signal correctly at a high speed.

(Another Modified Example)

Figure 6:
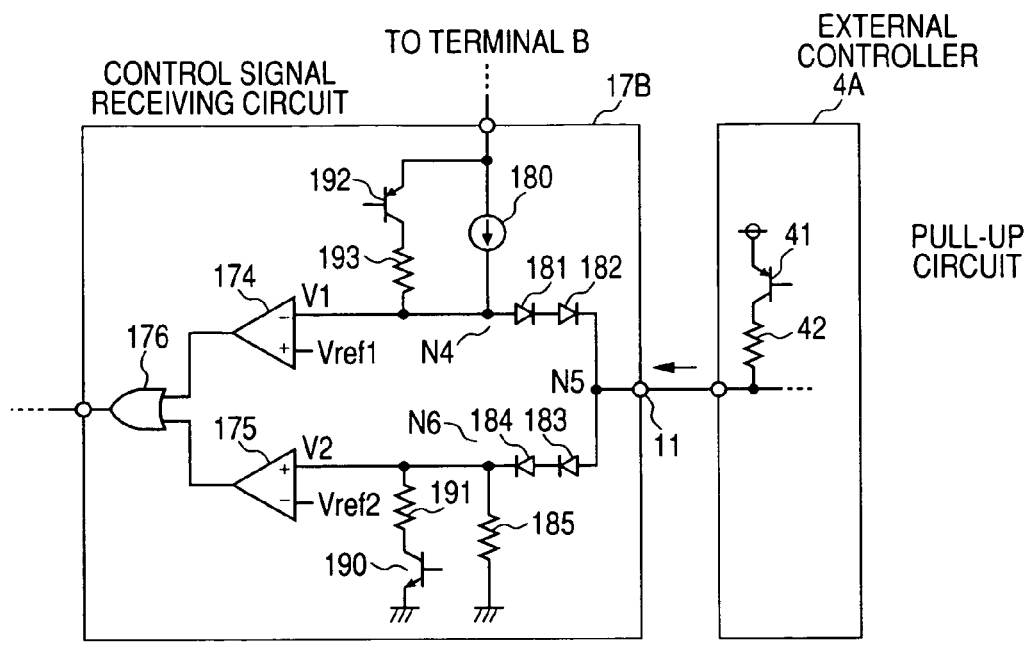
FIG. 6 is a diagram showing another modified configuration of the control signal receiving circuit in the electric power generation control apparatus shown in FIG. 1.
Figure 7:
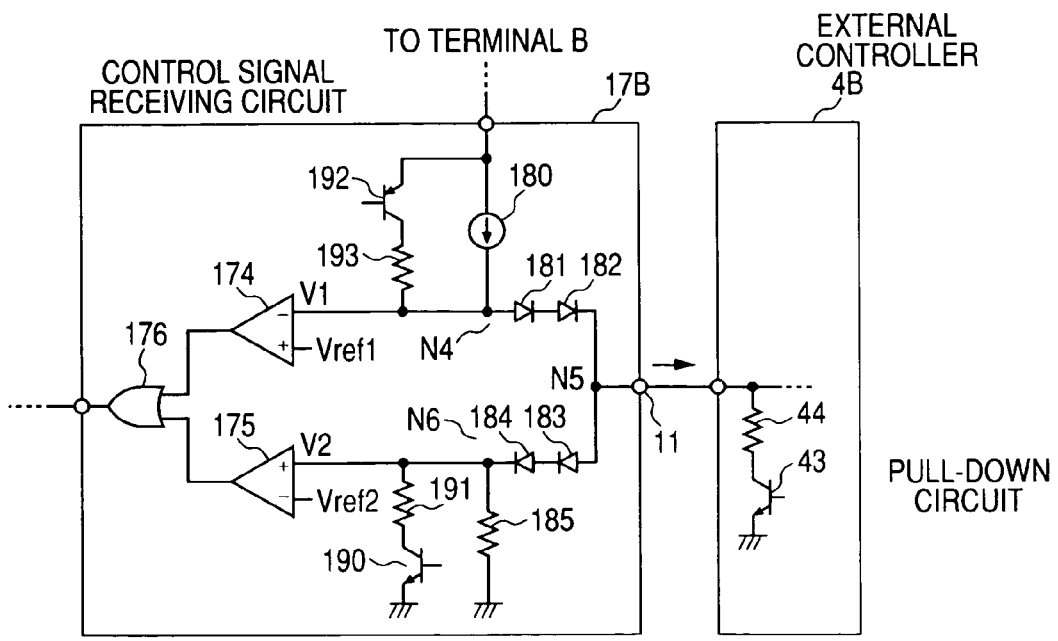
FIG. 7 is a diagram showing another modified configuration of the control signal receiving circuit in the electric power generation control apparatus shown in FIG. 1.

FIG. 6 is a diagram showing another modified example of the control signal receiving circuit in the electric power generation control apparatus 1 of the first embodiment shown in FIG. 1. FIG. 7 is a diagram showing another modified example of the control signal receiving circuit in the electric power generation control apparatus 1 shown in FIG. 1.

The control signal receiving circuit 17B as another modified configuration further has a first leakage protection circuit and a second leakage protection circuit in addition to the configuration of the control signal receiving circuit 17A, as shown in both FIG. 4 and FIG. 5.

As shown in FIG. 6 and FIG. 7, the first leakage protection circuit is composed of a NPN type transistor 190 and a resistance 191. The second leakage protection circuit is composed of a PNP type transistor 192 and a resistance 193.

As shown in FIG. 6 and FIG. 7, the emitter of the PNP type transistor 190 is grounded and the collector thereof is connected to the connection node N6 and the input terminal of the second voltage comparator 175. The emitter of the PNP type transistor 192 is connected to the terminal B of the battery 3 (also the terminal of the vehicle alternator 2) and the collector thereof is connected to the connection node N4 and the input terminal of the first voltage comparator 174.

As shown in FIG. 6, when the control signal receiving circuit 17B in the electric power generation control apparatus 1 is connected to the external controller 4A composed of such a pull-up circuit, the first leakage protection circuit made of the NPN type transistor 190 and the resistance 191 becomes active because the NPN type transistor 190 becomes ON. The first leakage protection circuit is connected between the receiving terminal 11 and the ground, namely connected between the connection node N6 and the ground. The first leakage protection circuit made of the NPN type transistor 190 and the resistance 191 is capable of reducing an impedance between the receiving terminal 11 and the ground and thereby of prevent any detection error of the control signal which is occurred based on a small amount of a leakage current which flows into the control signal receiving circuit 17B from the pull-up circuit in the external controller 4A.

As shown in FIG. 7, when the control signal receiving circuit 17B in the electric power generation control apparatus 1 is connected to the external controller 4B composed of such a pull-down circuit, the second leakage protection circuit made of the PNP type transistor 192 and the resistance 193 becomes active because the PNP type transistor 192 becomes ON.

The second leakage protection circuit is connected between the receiving terminal 11 and the terminal B of the battery 3 (also the vehicle alternator 2), namely connected between the connection node N4 and the terminal B. The second leakage protection circuit made of the PNP type transistor 192 and the resistance 193 is capable of reducing an impedance between the receiving terminal 11 and the terminal B and thereby prevents any detection error of the control signal which is occurred based on a small amount of a leakage current which flows into the control signal receiving circuit 17B from the pull-down circuit in the external controller 4B.

Second Embodiment

A description will now be given of the electric power generation control apparatus according to the second embodiment of the present invention with reference to FIG. 8 and FIG. 9.

Figure 8:
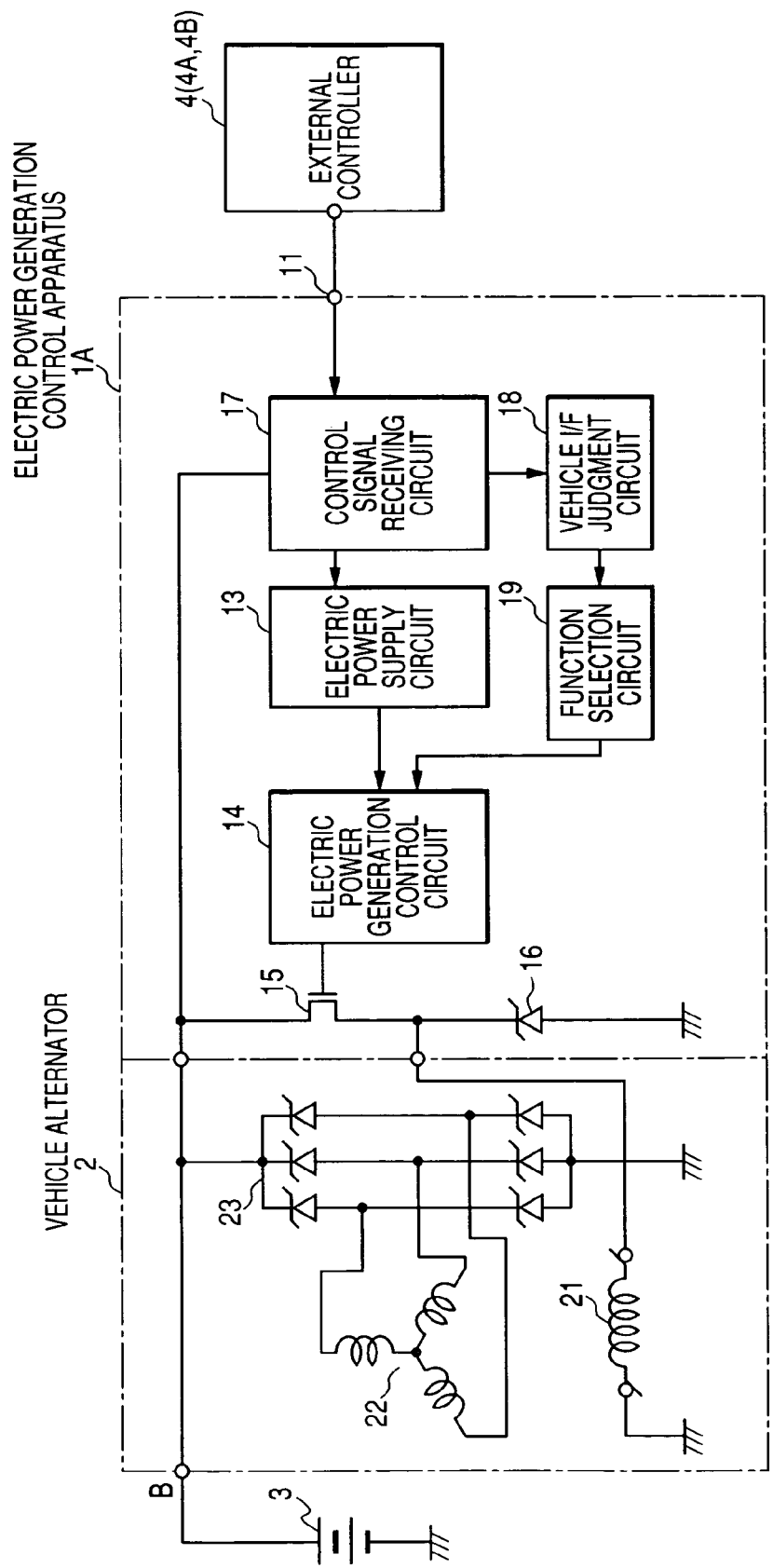
FIG. 8 is a diagram showing an entire configuration of an electric power generation control system having an electric power generation control apparatus according to a second embodiment of the present invention.

FIG. 8 is a diagram showing an entire configuration of the electric power generation control system having the electric power generation control apparatus 1A according to the second embodiment.

The electric power generation control system shown in FIG. 8 has the electric power generation control apparatus 1A having a different configuration from that of the electric power generation control apparatus 1 according to the first embodiment shown in FIG. 1.

The electric power generation control apparatus 1A shown in FIG. 8 further has additional components, namely a vehicle I/F (interface) judgment circuit 18 and a function selection circuit 19 in addition to the configuration of the electric power generation control apparatus 1 shown in FIG. 1.

The vehicle I/F judgment circuit 18 judges whether the external controller is composed of the pull-up circuit or the pull-down circuit, and outputs a judgment result to the function selection circuit 19 in the electric power generation control apparatus 1A.

The function selection circuit 19 receives the judgment result transferred from the vehicle I/F judgment circuit 18, and selects the function based on the judgment result.

Figure 9:
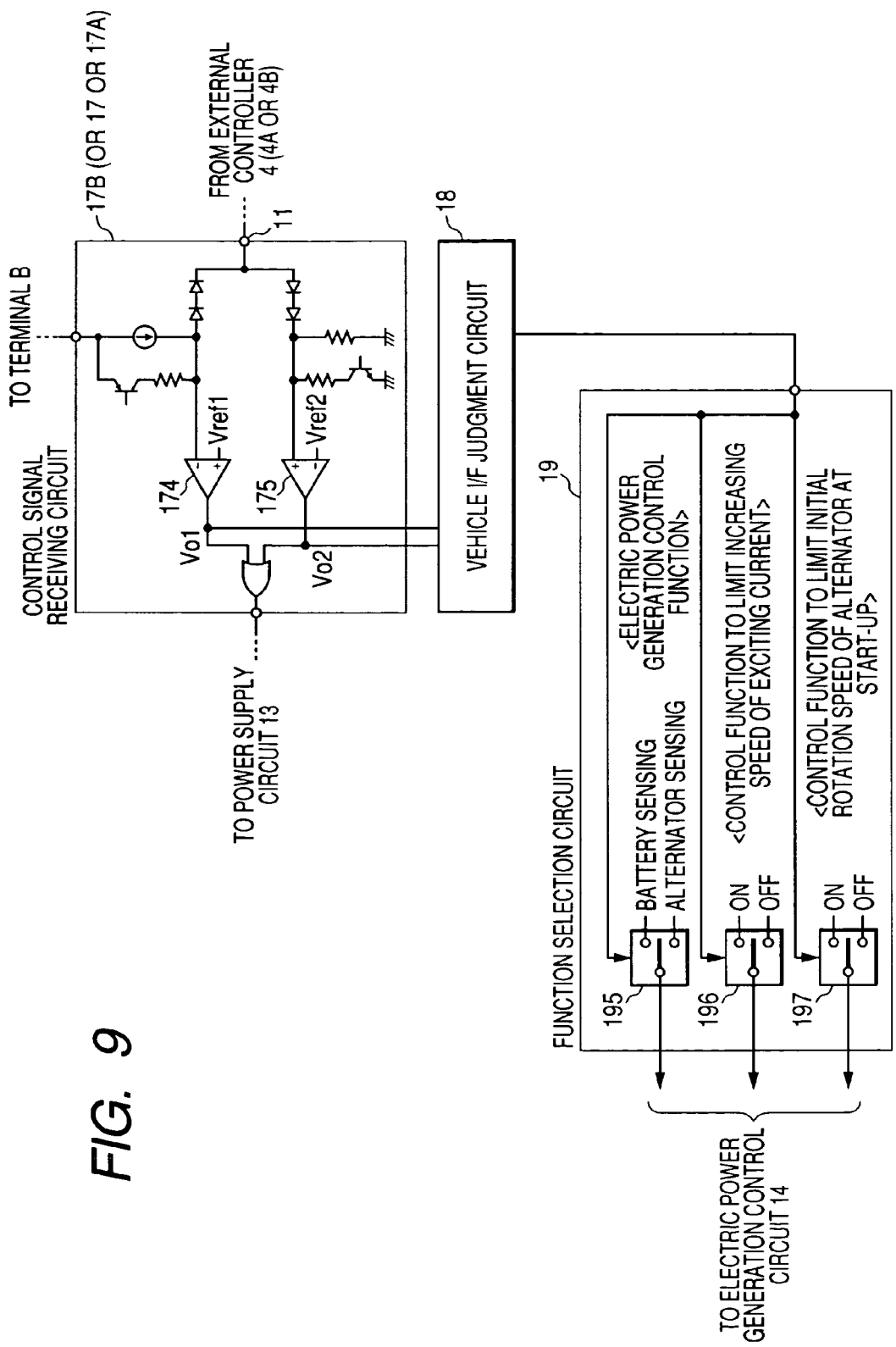
FIG. 9 is a diagram showing a detailed configuration of a function selecting circuit in the electric power generation control apparatus according to the second embodiment shown in FIG. 8.

FIG. 9 is a diagram showing the control signal receiving circuit 17B, the vehicle I/F judgment circuit 18, and the function selection circuit 19 in the electric power generation control apparatus 1A according to the second embodiment shown in FIG. 8. In particular, FIG.9 mainly shows a detailed configuration of the function selecting circuit 19.

As shown in FIG. 9, the output signals Vo1 and Vo2 of the first and second voltage comparators 174 and 175 in the control signal receiving circuit 17B are transferred to the vehicle I/F circuit 18. Although FIG.8 shows the control signal receiving circuit 17B, it is possible to incorporate the control signal receiving circuit 17 shown in FIG.2 and FIG.3 or the control signal receiving circuit 17A shown in FIG. 4 and FIG.5 instead of the control signal receiving circuit 17B shown in FIG. 6 and FIG. 7.

The vehicle I/F judgment circuit 18 generates the output signal based on both the output signals Vo1 and Vo2 transferred from the control signal receiving circuit 17B (also, 17 or 17A). In particular, when the external controller 4A composed of the pull-up circuit shown in FIG. 6 is connected to the control signal receiving circuit 17B (or 17 or 17A) through the receiving terminal 11, the voltage level of the output signal Vo2 of the voltage comparator 175 is switched according to the transmission of the electric power switch-on signal from the external controller 4A. The vehicle I/F judgment circuit 18 outputs the output signal of a high level.

On the other hand, when the external controller 4B composed of the pull-down circuit shown in FIG. 7 is connected to the control signal receiving circuit 17B (or 17 or 17A) through the receiving terminal 11, the voltage level of the output signal Vo1 of the voltage comparator 174 is switched according to the transmission of the electric power switch-on signal from the external controller 4B. The vehicle I/F judgment circuit 18 outputs the output signal of a low level.

The function selection circuit 19 is capable of switching various functions of the electric power generation voltage control apparatus 1. In the example shown in FIG. 9, the function control circuit 19 has three switches 195, 196, and 197. It is possible to perform the correct and the most suitable control operation for the vehicle alternator according to the vehicle design concept even if unmatched assembling in circuit type is done between the external controller and the electric power generation control apparatus mounted on the vehicle.

The switch 195 switches the control function for the generation of electric power according to the output signal from the vehicle I/F judgment circuit 18. For example, the switch 195 selects one of the functions, an alternator sensing function and a battery sensing function. The alternator sensing function controls the state of the generation of electric power of the vehicle alternator 2 based on the output voltage of the vehicle alternator 2. The battery sensing function controls the generation state of electric power of the vehicle alternator 2 based on the voltage potential at the terminal B of the battery 3. It is thereby possible in advance to avoid an over-charging state of the battery 3 to be caused when the control based on the alternator sensing manner is performed under the request from the vehicle side based on the battery sensing manner, and on the contrary, to avoid an over-discharging state of the battery 3 to be caused when the control based on the battery sensing manner is performed under the request from the vehicle side based on the alternator sensing manner.

The switch 196 switches ON/OFF states of the control function to limit the increasing speed of the exciting current flowing through the exciting winding in the vehicle alternator 2 based on the output signal from the vehicle I/F judgment circuit 18.

The switch 197 switches ON/OFF states of the control function to limit an initial rotation number of the rotor of the vehicle alternator 2 based on the output signal from the vehicle I/F judgment circuit 18.

It is thereby possible in advance to avoid occurrences of engine-stop and voltage-drop at the terminals of various lamps and bad-influences to other electronic devices caused by voltage-drop of the battery 3. The engine-stop of the internal combustion engine mounted on the vehicle is happed when unmatched control is performed to the requests from the vehicle side based on the control function to limit the exciting current increasing speed and the control function to limit the initial rotation speed of the vehicle alternator at the start-up, and when unmatched control is performed to the request from the vehicle not based on the control function to limit the exciting current increasing speed.

The electric power generation control circuit 14 has the configuration capable of performing the above various control functions. When receiving the output signals from the switches 195, 196, and 197, the electric power generation control circuit 14 performs the control operation corresponding to the selected functions based on those output signals.

Third Embodiment

A description will now be given of the electric power generation control apparatus according to the third embodiments of the present invention with reference to FIG. 10 and FIG. 11.

Figure 10:
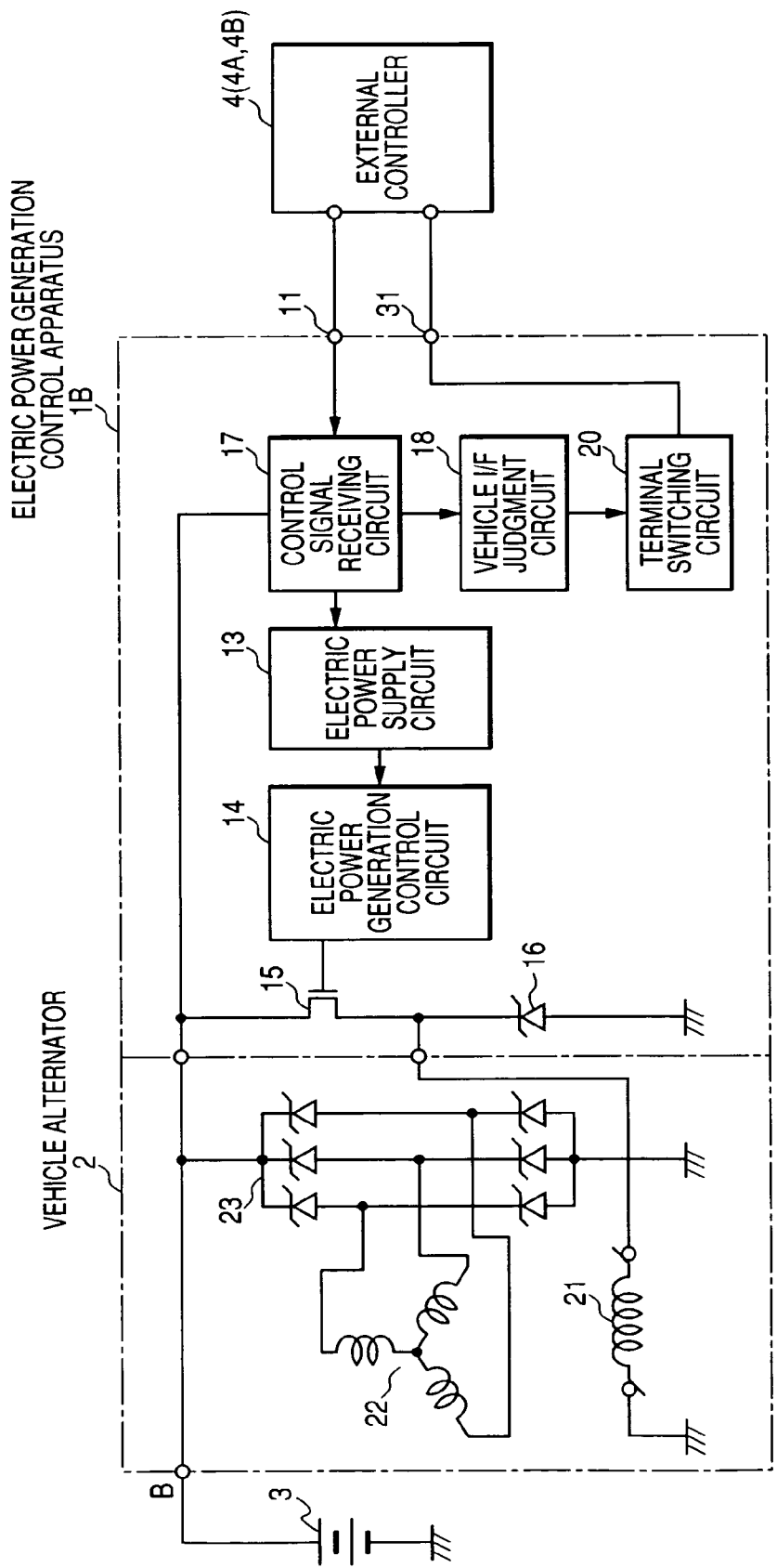
FIG. 10 is a diagram showing an entire configuration of an electric power generation control system having an electric power generation control apparatus according to a third embodiment of the present invention.

FIG. 10 is a diagram showing the entire configuration of the electric power generation control system having the electric power generation control apparatus 1B according to the third embodiment. FIG. 11 is a diagram showing a detailed configuration of a terminal switching circuit 20 in the electric power generation control apparatus 1B of the third embodiment shown in FIG. 10.

The electric power generation control system 1B shown in FIG. 10 has the terminal switching circuit 20 instead of the function selection circuit 19 in the electric power generation control apparatus 1A of the second embodiment shown in FIG. 8.

Figure 11:
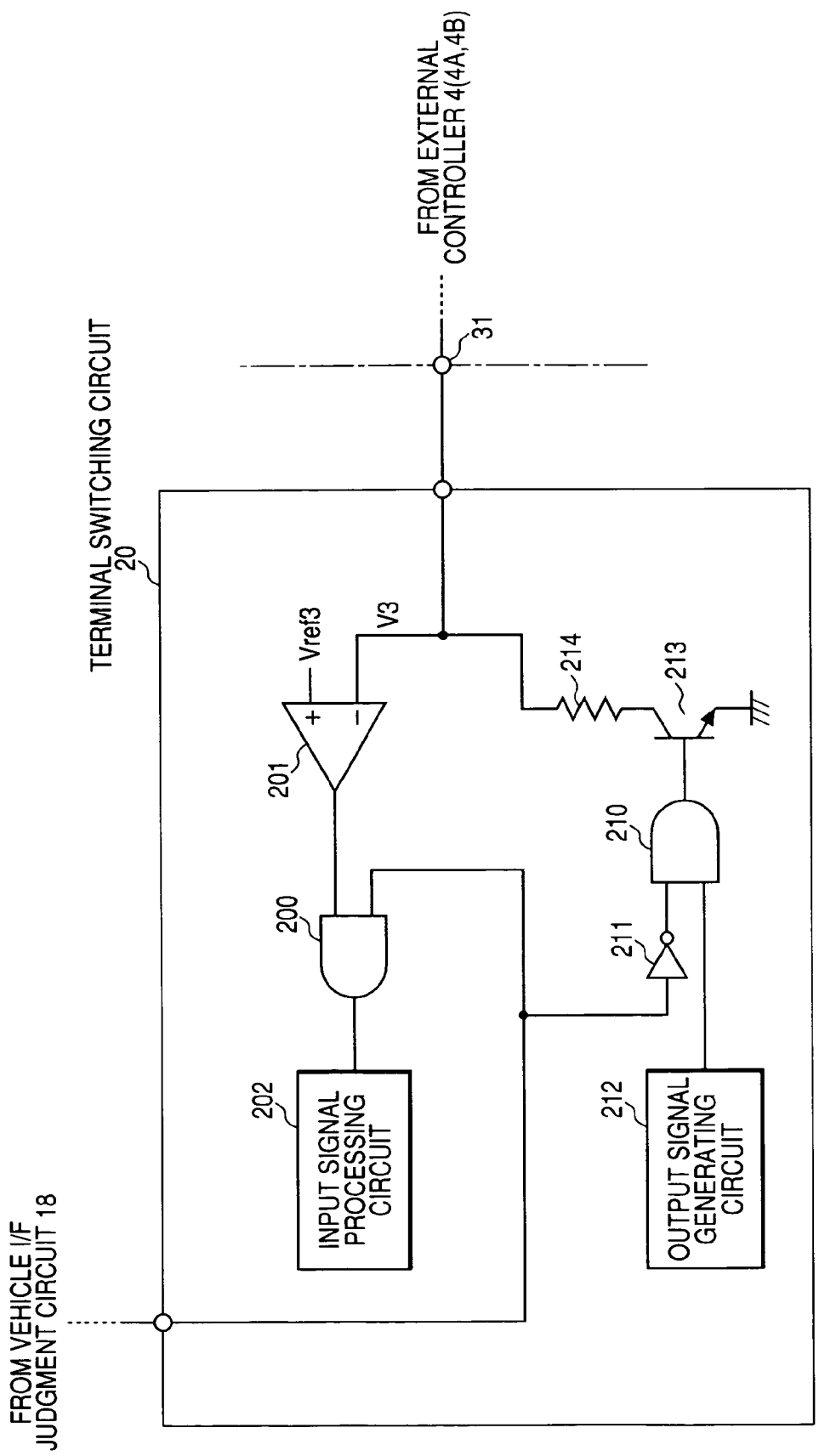
FIG. 11 is a diagram showing a detailed configuration of a terminal switching circuit in the electric power generation control apparatus according to the third embodiment shown in FIG. 10.

FIG. 11 shows the detailed configuration of the terminal switching circuit 20 having an AND circuit 200 and 210, a voltage comparator 201, an input signal processing circuit 202, an inverter circuit 211, an output signal generating circuit 212, a transistor 213, and a resistance 214.

In the terminal switching circuit 20 shown in FIG. 11, the output signal of the vehicle I/F judgment circuit 18 is transferred to one input terminal of the AND circuit 200 and the output signal of the voltage comparator 201 is transferred to the other input terminal of the AND circuit 200. The AND circuit 200 performs a logical AND operation between two input signals and outputs the operation result to the input signal processing circuit 202. An input/output terminal 31 of the electric power generation control apparatus 1B shown in FIG. 10 is connected to the external controller 4 (4A and 4B). The input/output terminal 31 is connected to a negative (−) input terminal of the voltage comparator 201 and a reference voltage Vref3 is supplied to the other input terminal of the voltage comparator 201. The voltage comparator 201 outputs a high level signal when a voltage V3 at the input/output terminal 31 is lower than the reference voltage Vref3. On the contrary, the voltage comparator 201 outputs a low level signal when the voltage V3 at the input/output terminal 31 is higher than the reference voltage Vref3.

The AND circuit 200 outputs the output signal of the voltage comparator 201 when receiving the high level output signal supplied from the vehicle I/F judgment circuit 18, and on the contrary, halts the output signal from the voltage comparator 201 when receiving the low level output signal supplied from the vehicle I/F judgment circuit 18.

The input signal processing circuit 202 receives the output signal of the AND circuit 200, namely the output signal from the voltage comparator 201, and then performs a predetermined process.

Thus, the terminal switching circuit 20 uses the input/output terminal 31 as the input terminal when the vehicle I/F judgment circuit 18 outputs the high level output signal, and in this condition, the input signal obtained through the input terminal 31 is transferred to the input signal processing circuit 202.

The inverter circuit 211 inverts the output signal of the vehicle I/F judgment circuit 18 and transfers the inverted signal to one input terminal of the AND circuit 210. The output signal of the output signal generating circuit 212 is supplied to the other input terminal of the AND circuit 210. The AND circuit 210 performs the logical AND operation between those two input signals, and outputs the logical operation result to the transistor 213.

The output signal generating circuit 212 generates the output signal to be transferred to the external controller 4 (4A and 4B) through the transistor 213, the resistance 214, and the input/output terminal 31. For example, the output signal generating circuit 212 generates an exciting driving signal that indicates the driving state (namely, on-duty state) of the exciting driving transistor 15 shown in FIG. 10. The output terminal of the AND circuit 210 is connected to the base of the transistor 213. The emitter of the transistor 213 is grounded, and the collector thereof is connected to the input/output terminal 31 through the resistance 214. Because the output signal of the output signal generating circuit 212 is supplied to the transistor 213 through the AND circuit 210 when the output signal of the vehicle I/F judgment circuit 18 is the low level signal, the transistor 213 is driven, namely becomes active based on the receiving of the output signal from the AND circuit 210, and the output signal is transferred to the external controller 4 (4A, 4B) through the input/output terminal 31.

Thus, because it is possible to set the function of the input/output terminal 31 according to the specification of the vehicle I/F judgment circuit 18, it is thereby possible to reduce the number of terminals and wirings when compared with the case in which both the output terminal and the input terminal are formed.

The configuration of the electric power generation control apparatus is not limited by the above various embodiments and it is possible to apply the concept of the present invention to various modifications. For example, when external controller transfers control signals other than the electric power switch-on signal, the control signal receiving circuits 17, 17A, and 17B can receive those control signals correctly regardless of considering any type of the vehicle I/F circuit incorporated in the external controller.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric power generation control apparatus to be connected to an external controller equipped with a vehicle interface circuit configured to generate and output a control signal, the external controller may be of any one circuit type of different circuit types, comprising:

a control signal receiving circuit configured to receive the control signal corresponding to the circuit type of the external controller through a receiving terminal and that generates a start instruction signal from the control signal;

an electric power supply circuit configured to initiate its operation when the control signal receiving circuit receives the control signal transferred from the external controller; and an electric power generation control circuit configured to control an electric power generation in a vehicle alternator based on the electric power supplied by the electric power supply circuit;

wherein the vehicle interface circuit incorporated in the external controller is made of one of a pull-up circuit and a pull-down circuit, and the vehicle interface circuit generates a power switch-on signal as the control signal and transfers the power switch-on signal to the electric power generation control apparatus, and the control signal receiving circuit detects the power switch-on signal transferred from one of the pull-up circuit and the pull-down circuit incorporated in the external controller based on a voltage potential at the receiving terminal.

2. An electric power generation control apparatus to be connected to an external controller equipped with a vehicle interface circuit configured to generate and output a control signal, the external controller may be of any one circuit type of different circuit types, comprising:

a control signal receiving circuit configured to receive the control signal corresponding to the circuit type of the external controller through a receiving terminal and that generates a start instruction signal from the control signal;

an electric power supply circuit configured to initiate its operation when the control signal receiving circuit receives the control signal transferred from the external controller; and an electric power generation control circuit configured to control an electric power generation in a vehicle alternator based on the electric power supplied by the electric power supply circuit;

wherein the vehicle interface circuit incorporated in the external controller is made of one of a pull-up circuit and a pull-down circuit, and the vehicle interface circuit generates a power switch-on signal as the control signal and transfers the power switch-on signal to the electric power generation control apparatus, the receiving terminal is connected to a connection node between a constant current circuit and a plurality of diodes connected in series, and the control signal receiving circuit detects the power switch-on signal transferred from one of the pull-up circuit and the pull-down circuit incorporated in the external controller based on a direction of current flow at the receiving terminal.

3. The electric power generation control apparatus according to claim 2, wherein the control signal receiving circuit comprises:

a constant current circuit, one terminal thereof being connected to a terminal of a battery mounted on a vehicle;

a first pair of diodes and a second pair of diodes connected in series, and a connection node between the first pair of diodes and the second pair of diodes being connected to the receiving terminal;

a resistance, one end thereof being connected to the second pair of diodes, and the other end thereof being grounded;

a first voltage comparator, one input terminal thereof being connected to a connection node between the other end of the constant current circuit and the first pair of diodes, and a first reference voltage being supplied to the other input terminal of the first voltage comparator;

a second voltage comparator, one input terminal thereof being connected to a connection node between the one end of the resistance and the second pair of diodes, and a second reference voltage being supplied to the other input terminal of the second voltage comparator; and an OR circuit, a pair of input terminals thereof being connected to output terminals of both the first voltage comparator and the second voltage comparator.

4. The electric power generation control apparatus according to claim 3, wherein the external controller is one of circuit types of a pull-up circuit made of a transistor and a resistance and a pull-down circuit made of a resistance and a transistor, and generates a power switch-on signal as the control signal and transfers the power switch-on signal to the electric power generation control apparatus, and under the condition where the external controller connected to the electric power generation control apparatus is composed of the pull-up circuit, the first reference voltage Vref1 and the second reference voltage Vref2 are set to satisfy a first relationship (V2<Vref2<Vref1<V1) when the transistor in the pull-up circuit is OFF, and the first reference voltage Vref1 and the second reference voltage Vref2 are set to satisfy a second relationship (Vref2<V2<Vref1<V1) when the transistor in the pull-up circuit is ON, where V1 is a voltage potential at a connection node between the constant current circuit and the first pair of diodes, and V2 is a voltage potential at a connection node between the second pair of diodes and the resistance whose one end is connected to the second pair of diodes, and whose other end is grounded.

5. The electric power generation control apparatus according to claim 4, wherein under the condition where the external controller connected to the electric power generation control apparatus is composed of the pull-down circuit, the first reference voltage Vref1 and the second reference voltage Vref2 are set to satisfy the first relationship (V2<Vref2<Vref1<V1) when the transistor in the pull-down circuit is OFF, and the first reference voltage Vref1 and the second reference voltage Vret2 are set to satisfy a third relationship (V2<Vref2<V1<Vref1) when the transistor in the pull-down circuit is ON.

6. An electric power generation control apparatus to be connected to an external controller equipped with a vehicle interface circuit configured to generate and output a control signal, the external controller may be of any one circuit type of different circuit types, comprising:

a control signal receiving circuit configured to receive the control signal corresponding to the circuit type of the external controller through a receiving terminal and that generates a start instruction signal from the control signal;

an electric power supply circuit configured to initiate its operation when the control signal receiving circuit receives the control signal transferred from the external controller; and an electric power generation control circuit configured to control an electric power generation in a vehicle alternator based on the electric power supplied by the electric power supply circuit;

a vehicle interface judgment circuit configured to judge a circuit type of the vehicle interface circuit incorporated in the external controller; and a function selection circuit configured to select one of functions of the electric power generation control circuit based on a judgment result of the vehicle interface judgment circuit.

7. The electric power generation control apparatus according to claim 6, wherein the function selection circuit selects an electric power generation control function as one selectable function to control a generation state of electric power of a vehicle alternator mounted on a vehicle.

8. The electric power generation control apparatus according to claim 7, wherein the function selection circuit selects one of the selectable functions:

a function to control the generation state of electric power of the vehicle alternator based on an output voltage of the vehicle alternator; and a function to control the generation state of electric power of the vehicle alternator based on a terminal voltage of a battery connected to the vehicle alternator.

9. The electric power generation control apparatus according to claim 6, wherein the function selection circuit selects a function as one of the selectable functions, to limit an increasing speed of an exciting current flowing through the vehicle alternator.

10. The electric power generation control apparatus according to claim 6, wherein the function selection circuit selects a function as one of the selectable functions, to limit an initial rotation number of the vehicle alternator at a start-up of an internal combustion engine mounted on the vehicle.

11. An electric power generation control apparatus to be connected to an external controller equipped with a vehicle interface circuit configured to generate and output a control signal, the external controller may be of any one circuit type of different circuit types, comprising:
- a control signal receiving circuit configured to receive the control signal corresponding to the circuit type of the external controller through a receiving terminal and that generates a start instruction signal from the control signal;
- an electric power supply circuit configured to initiate its operation when the control signal receiving circuit receives the control signal transferred from the external controller;
- an electric power generation control circuit configured to control an electric power generation in a vehicle alternator based on the electric power supplied by the electric power supply circuit;
- an input/output terminal connected to the external controller;
- a judgment circuit configured to judge the circuit type of the vehicle interface circuit incorporated in the external controller; and
- a terminal switching circuit configured to switch the input/output terminal to one of the input terminal and the output terminal according to the circuit type of the vehicle interface circuit of the external controller judged by the judgment circuit.

12. An electric power generation control apparatus to be connected to an external controller equipped with a vehicle interface circuit configured to generate and output a control signal, the external controller may be of any one circuit type of different circuit types, comprising:
- a control signal receiving circuit configured to receive the control signal corresponding to the circuit type of the external controller through a receiving terminal and that generates a start instruction signal from the control signal;
- an electric power supply circuit configured to initiate its operation when the control signal receiving circuit receives the control signal transferred from the external controller;
- an electric power generation control circuit configured to control an electric power generation in a vehicle alternator based on the electric power supplied by the electric power supply circuit;
- wherein the control signal receiving circuit comprises:
  - first, second, third, and fourth resistances connected in series, a connection node between the second resistance and the third resistance being connected to the receiving terminal, and the fourth resistance being grounded;
  - a first voltage comparator, one input terminal thereof being connected to a connection node between the first and second resistances, and a first reference voltage being supplied to the other input terminal of the first voltage comparator;
  - a second voltage comparator, one input terminal thereof being connected to a connection node between the third and fourth resistances, and a second reference voltage being supplied to the other input terminal of the second voltage comparator; and
  - an OR circuit, a pair of input terminals thereof being connected to output terminals of both the first voltage comparator and the second voltage comparator.

13. The electric power generation control apparatus according to claim 12, wherein the external controller is one of circuit types of a pull-up circuit made of a transistor and a resistance and a pull-down circuit made of a resistance and a transistor, and generates a power switch-on signal as the control signal and transfers the power switch-on signal to the electric power generation control apparatus, and
- under the condition where the external controller connected to the electric power generation control apparatus is composed of the pull-up circuit, the first reference voltage Vref1 and the second reference voltage Vref2 are set to satisfy a first relationship (V2<Vref2<Vref1<V1) when the transistor in the pull-up circuit is OFF, and
- the first reference voltage Vref1 and the second reference voltage Vref2 are set to satisfy a second relationship (Vref2<V2<Vref1<V1) when the transistor in the pull-up circuit is ON, where V1 is a voltage potential at a connection node between the first resistance and the second resistance, V2 is a voltage potential at a connection node between the third resistance and the fourth resistance.

14. The electric power generation control apparatus according to claim 13, wherein under the condition where the external controller connected to the electric power generation control apparatus is composed of the pull-down circuit, the first reference voltage Vref1 and the second reference voltage Vref2 are set to satisfy the first relationship (V2<Vref2<Vref1<V1) when the transistor in the pull-down circuit is OFF, and the first reference voltage Vref1 and the second reference voltage Vref2 are set to satisfy a third relationship (V2<Vref2<V1<Vref1) when the transistor in the pull-down circuit is ON.

15. An electric power generation control apparatus to be connected to an external controller equipped with a vehicle interface circuit configured to generate and output a control signal, the external controller may be of any one circuit type of different circuit types, comprising:
- a control signal receiving circuit configured to receive the control signal corresponding to the circuit type of the external controller through a receiving terminal and that generates a start instruction signal from the control signal;
- an electric power supply circuit configured to initiate its operation when the control signal receiving circuit receives the control signal transferred from the external controller; and
- an electric power generation control circuit configured to control an electric power generation in a vehicle alternator based on the electric power supplied by the electric power supply circuit,
- wherein the control signal receiving circuit further comprises a first leakage protection circuit and a second leakage protection circuit that are selectively connected to the receiving terminal according to the circuit type of the vehicle interface circuit incorporated in the external controller connected to the electric power generation control apparatus through the receiving terminal.

16. The electric power generation control apparatus according to claim 15, wherein the control signal receiving circuit comprises:
- a constant current circuit, one terminal thereof being connected to a terminal of a battery mounted on a vehicle;
- a first pair of diodes and a second pair of diodes connected in series, and a connection node between the first pair of diodes and the second pair of diodes being connected to the receiving terminal;
- a resistance, one end thereof being connected to the second pair of diodes, and the other end thereof being grounded;

a first voltage comparator, one input terminal thereof being connected to a connection node between the other end of the constant current circuit and the first pair of diodes, and a first reference voltage being supplied to the other input terminal of the first voltage comparator;

a second voltage comparator, one input terminal thereof being connected to a connection node between the one end of the resistance and the second pair of diodes, and a second reference voltage being supplied to the other input terminal of the second voltage comparator; and an OR circuit, a pair of input terminals thereof being connected to output terminals of both the first voltage comparator and the second voltage comparator, wherein the first leakage protection circuit comprises a transistor and a resistance, an emitter of the transistor is connected to the terminal of the battery, and an collector of the transistor is connected the one input terminal of the first voltage comparator, and the second leakage protection circuit comprises a transistor and a resistance, an emitter of the transistor is grounded, and an collector of the transistor is connected the one input terminal of the second voltage comparator.

* * * * *